Nov. 28, 1950  E. M. CLAYTOR  2,531,500
SOLENOID UNIT
Filed Feb. 13, 1948
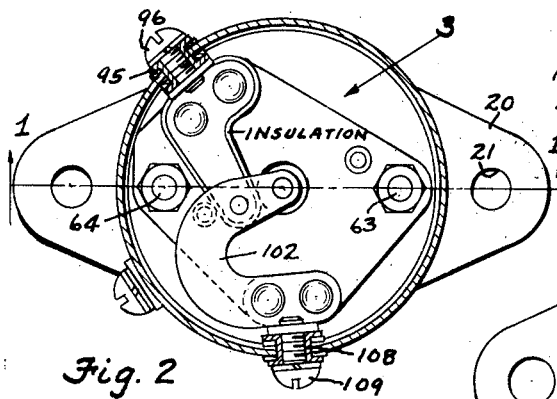
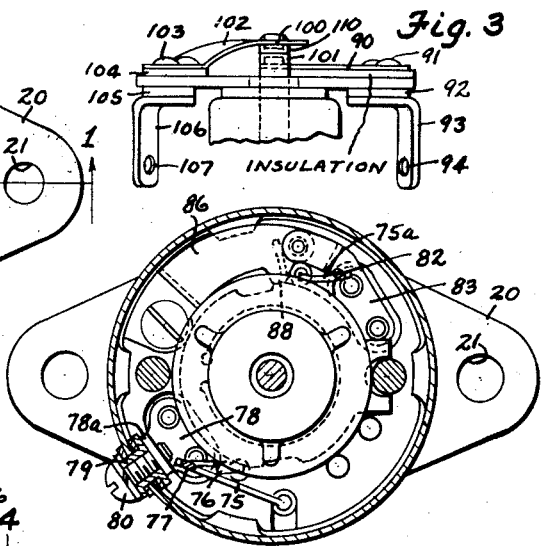
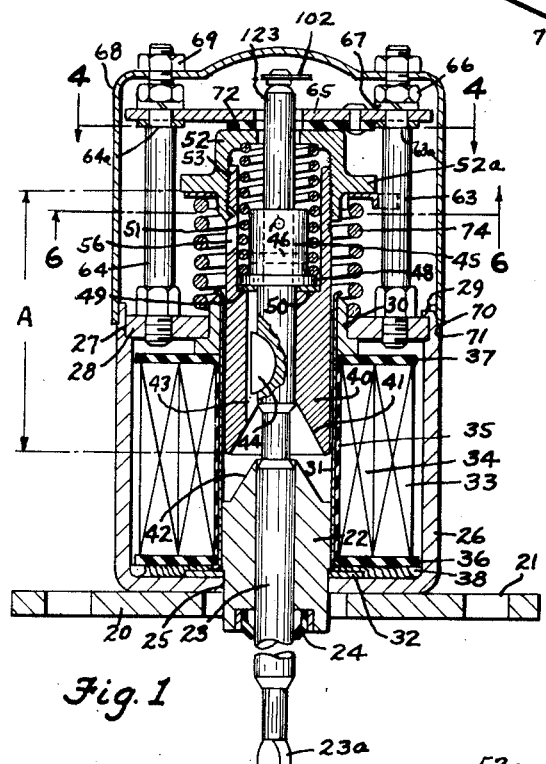
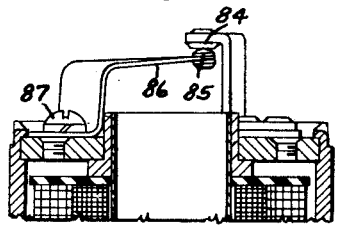
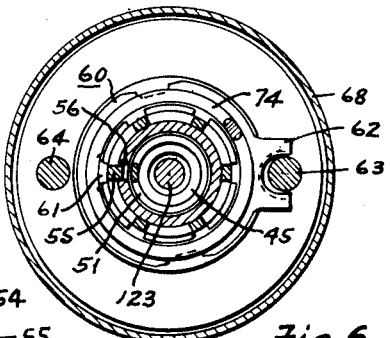
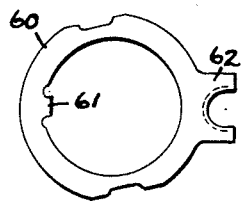
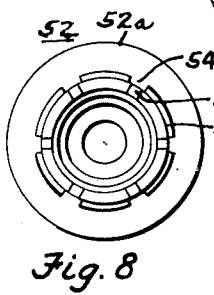
INVENTOR.
EDWARD M. CLAYTOR
BY Spencer, Hardman & Fehr
HIS ATTORNEYS

UNITED STATES PATENT OFFICE 2,531,500

SOLENOID UNIT

Edward M. Claytor, Anderson, Ind., assignor to General Motors Corporation, Detroit, Mich., a corporation of Delaware Application February 13, 1948, Serial No. 8,209

3 Claims. (Cl. 175—341)

The present invention is related, for example, to the type of solenoid unit which comprises magnet windings surrounding a magnetizable plunger armature which, when the windings are energized, moves a rod whose inner end is connectible with a transmission controlling device such as a pawl for engaging a device for locking the sun gear of the overdrive. When the windings are deenergized, motion of the armature in the opposite direction to retract the rod is effected by a spring which urges a nut threaded on the armature against a stop which limits the distance through which the rod is retracted and therefore determines the location of the inner end of the rod. In order that the location of the inner end of the rod, may be precisely fixed, the nut is adjusted on the armature.

An object of the present invention is to provide for locking the nut to the armature in a position which will deviate from the position to which it had been turned for precise adjustment by a small fraction of a turn, for example, one-twelfth of a turn at the most. By using a nut thread pitch as fine as practicable, the nut can be locked in a position such that the location of the pawl receiving end of the pawl rod will be within prescribed limits.

A further object is to provide for locating the rod in a definite angular position relative to the solenoid assembly while providing for longitudinal movement thereof for the purposes previously stated. For example, such definite angular location of the rod is necessary if the device with which the solenoid unit is installed requires a rod having a flat or parallel flats on its inner end. This object is accomplished by means fixing the location of the rod angularly relative to the armature and by the addition of a member readily assembled with the nut in correct angular location and adapted to engage an already existing part extending parallel to the rod whereby the flats on the rod are located in a definite relation to the solenoid assembly.

An object of the present invention is to standardize the parts which make up the solenoid units so as to reduce the number of different parts required to make up solenoid units for different customers and to provide a unit in which the pawl rod can be adjusted accurately according to the requirements of a particular customer.

Further objects and advantages of the present invention will be apparent from the following description, reference being had to the accompanying drawings wherein a preferred embodiment of the present invention is clearly shown.

In the drawings:

Fig. 1 is a longitudinal sectional view of the solenoid unit taken on the line 1—1 of Fig. 2.

Fig. 2 is an end view with the solenoid cover shown in section.

Fig. 3 is a fragmentary view showing one of the solenoid switches and is viewed in the direction of the arrow 3 of Fig. 2.

Fig. 4 is a sectional view on line 4—4 of Fig. 1.

Fig. 5 is a fragmentary longitudinal sectional view through the electromagnet and it shows a side elevation of another of the solenoid switches.

Fig. 6 is a sectional view taken on line 6—6 of Fig. 1.

Fig. 7 is a top plan view of a locking plate shown in Fig. 6.

Fig. 8 is a bottom plan view of an adjusting member shown in Fig. 1.

Referring to the drawing 20 designates a mounting bracket having apertured ears 21 for receiving screws which attach the bracket to the housing of the overdrive, not shown. The bracket 20 is centrally apertured to receive a magnetizable solenoid core 22 which is centrally apertured to receive a pawl rod 23. The rod 23 is slidable through a packing device 24 to prevent the escape of excessive amount of lubricant from the overdrive housing through the core 22.

The core 22 extends through an opening 25 in a cup-shaped magnetizable housing 26 which is spot-welded or brazed to the plate 20. Housing 26 is provided at its upper end with a counterbore to provide a shoulder 27 for receiving a magnetizable plate 28 secured against the shoulder 27 by riveting over portion 29 of the housing 26. The plate 28 is centrally apertured to receive a magnetizable bushing 30 which is centrally apertured to receive a non-magnetizable tube 31 which fits around the core 22 and extends against a washer 32. The core 22 is surrounded by magnet coils 33 and 34. The coil 33 in this instance constitutes the main attracting coil while the coil 34 forms the armature holding coil. These coils are wound around an insulating tube 35 through which the tube 31 passes and are confined between end discs 36 and 37. The disc 36 is urged against a packing ring 38 of insulating rope. The disc 37 is engaged by the bushing 30. The magnet coils are rigidly held in position within the cup 26 by the tangs 29 which are riveted over against the plate 38. The plate 28 is provided with suitable openings for bringing out the terminal wires or leads which are attached to certain terminals and switch parts to be described.

The tube 31 provides for the sliding movement of an armature 40 having a conical cavity 41 to conform to the conical tubular boss 42 of the core 22. Armature 40 is provided with a groove 43 for receiving a key 44 fixed within a notch provided by the pawl rod 23. In this way, relative rotation between rod 23 and armature 40 is prevented while providing for relative longitudinal movement between these parts. Rod 23 extends through a non-magnetizable sleeve 45 attached to the rod 23 by pins 46. Sleeve 45 has a flange or collar 48 which normally rests on a washer 49 which seats against a shoulder 50 provided by armature 40 and is engaged by a spring 51 confined in a state of normal compression by a nut 52 having fine threads for engagement with fine screw threads 53 on the upper end of armature 40. The nut 52 has a flange 52a, the under side of which projects a sleeve portion having a series of spaced notches 54. The sleeve is reduced in dimension at 52c and this reduced portion is provided with a series of longitudinal tangs 55 extending from the lower end thereof. In this instance the number of slots and tangs number six and the tangs are located directly below the notches. By this arrangement a finer adjustment between the nut 52 and armature 40 can be had. After the nut 52 has been threaded into the correct position of adjustment relative to the armature 40, one of the tangs 55 is bent into a slot 56 of the armature. Thus the nut 52 is prevented from rotating relative to the armature 40.

After the nut 52 is located in the desired position of adjustment, it is desirable that the rotation of the armature 40 with respect to the entire solenoid assembly be prevented. This is accomplished by a ring shaped locking plate 60. This plate has an inwardly extending tang 61 which extends into one of the notches 54 which is directly above the tang which has been bent into the notch 56 of the armature 46. The plate 60 is also provided with a notched extension 62 which straddles a rod 63 or stationary part attached at its lower end to plate 28. A similar post 64 parallels the post 63. The posts 63 and 64 are provided near their upper ends with shoulders 63a and 64a, respectively, for receiving a plate 65 secured by nuts 66 and lock washers 67. The upper ends of posts 63 and 64 extend through openings in a cup-shaped cover 68 and receive nuts 69 for securing the cover in position with its lower edge 70 bearing against a shoulder 71 provided by housing 26. The plate 65 supports on its underside, a non-metallic bumper plate 72 secured by rivet 73. Bumper plate 72 is engaged by nut 52 which normally bears against bumper 72 since the nut is urged upwardly by pawl rod return spring 74 confined in a normal state of compression between plate 60 and plate 28.

Wires 75 and 76 connected, respectively, with armature attracting coil 33 and with armature holding coil 34 are soldered at 77 to a bracket 78 insulatingly supported by plate 28. When the cover 68 is in proper location with respect to the housing 26, a bushing 79 insulatingly supported by cover 68 will be located in alignment with the tapped hole in an ear 78a of bracket 78. A terminal screw 80 is passed through the bushing 79 and is screwed into the tapped ear 78a of bracket 78 to provide means for connecting a wire electrically with the bracket 78 as well as providing means for holding cover 68 in position.

As stated before, wire 76 is connected with one end of a solenoid armature holding coil 34, the other of which is grounded on the solenoid frame. One end of wire 75 is connected with armature attracting coil 33. The other end of attracting coil 33 is connected with wire 75a soldered at 82 to a bracket 83 insulatingly supported by plate 28 and carrying a contact 84 (Fig. 5) which is engageable with a contact 85 carried by a leaf spring contact bracket 86 secured by screw 87 to plate 28. Bracket 86 is directly grounded through the plate 28. The bracket 86 has an ear 88 located in the path of movement of the flange 53 of nut 52. When terminal 90 is connected with a source of current, the solenoid coils 33 and 34 are both energized to attract armature 40 downwardly. An armature 40 moves toward core 22, nut flange 53 engages ear 88 of bracket 96 thereby causing it to move downwardly (Fig. 5) to separate contact 85 from contact 84 in order to open circuit the solenoid attracting coil 33, leaving only the holding coil 34 energized to hold armature 40 in attracting position.

Downward movement of armature 40 (Fig. 1) causes pawl rod 23 to move downwardly and to force pawl against a blocker ring associated with an overdrive unit, not shown. The downward movement of rod 23 causes the armature 40 to move downwardly and further to compress spring 51 as explained in detail in my Patent Number 2,330,407 issued September 28, 1943. When the blocking ring releases the pawl, it is moved into engagement with the sun gear locking ring by the spring 60, and rotation of the sun gear is prevented. When the sun gear is locked, the transmission is in overdrive.

The current flow to the terminal 80 is interrupted so that holding coil 34 is deenergized thereby permitting spring 74 to move the armature 40 upwardly. As set forth in my patent referred to the retraction of the pawl from the sun gear locking ring is facilitated by interruption of engine ignition. In order to provide restoration of engine ignition in response to upward movement of pawl rod 23, there is provided a switch see Figs. 2 and 3, which comprises a contact bracket 90 insulatingly supported by plate 65 and attached thereto by rivets 91 which secure also a spacer 92 and a metal bracket 93 having a tapped hole 94 which, when the cover 68 is in the correct position, is in alignment with an apertured bushing 95 insulatingly supported by cover 68. Through bushing 95, a terminal screw 96 may be passed and be threadedly connected with the bracket 93 thus making an electrical connection between a wire secured by screw 96 with contact bracket 90. Bracket 90 carries a contact 101 normally spaced from a movable contact 100 carried by a leaf spring blade 102 grounded on plate 65 and attached thereto by rivets 103 which secure also a spacer 104, a spacer 105 and an angle bracket 106 having a tapped hole 107 which, when cover 68 is in the correct position, is in alignment with a bushing 108 apertured to receive a screw 109 which can be screwed into the threaded hole 107 of bracket 106. Contact blade 102 carries a nonconducting button 110 for engagement by the upper end 123 of pawl rod 23. When rod returns to normal position shown, the end 123 engages button 110 and moves blade 102 upwardly to separate its contact 100 from the contact 101 of bracket 90 thus interrupting an ignition grounding circuit.

Inasmuch as the solenoid units as described are used in electrical overdrive controls a very great saving in the manufacture of these units may be effected by standardization resulting in the reduction of the number of different parts required to make up the solenoid unit for different customers. For example one customer may require a solenoid unit which will require that the pawl rod 23 move a certain distance while another will require that the rod move a less distance and still another will require the rod to move a greater distance. In such arrangements each customer requires a different armature assembly.

The armature assembly as illustrated in Fig. 1 has a number of parts which are so designed as to permit a convenient assembly of the parts that can be arranged and adjusted to meet certain requirements for different solenoid units for different overdrives, thus a great saving in making armature assemblies for these solenoid units is had. This armature assembly comprises the pawl rod 22, armature 40, sleeve 45, spring 51, and the nut 52 which can be standard parts for several different forms of solenoid units. By having these parts standardized, all that is necessary to know to suit the requirements of a particular solenoid unit is a certain fixed dimension, namely that dimension extending from the lower side of the flange 52a of nuts 52 to the lower end of the armature 40. This dimension is represented by the letter A. When this dimension A is known the operator can easily adjust the parts of the armature assembly to suit the particular solenoid unit. One method of obtaining this dimension A is to plan the lower end of the armature against a stationary part and have a stop positioned the required distance above the stationary so that when the lower side of the flange 52a contacts the stop the operator will know that the required dimension has been reached. After this operation the operator bends the tang in alignment with the notch 56 inwardly.

In case one of the tangs 55 is not in perfect alignment with the notch 56, the operator screws or unscrews the nut 52 until the nearest tang 55 is in alignment with the notch 56. Since there are six tangs, the operator will not turn the nut more than 30° or in other words more than one-twelfth of a turn. After the tang 55 is bent inwardly sufficiently so that it will extend into the notch 56, the nut is prevented from turning relative to the armature. After the tang is bent, the armature assembly is ready to be assembled with the solenoid unit for which it was intended.

Before the armature assembly is mounted with the solenoid unit, the heavy spring 74 and the locking plate 60 is placed under the flange 52a, the tongue 61 fitting into the notch 54, that is directly above the bent in tang 55. This operation places the notched extension 62, of the locking plate 60 in position to straddle the post 63 to prevent the armature assembly from turning relative to the solenoid unit.

In assembling the unit with the overdrive mechanism, the assembler grasps the unit and passes the pawl rod 22 through an opening in the overdrive mechanism and moves the unit toward the overdrive assembly until the bracket 21 engages a mounting pad provided by the overdrive housing. It is to be understood that the wing portions 23a of the rod 23 will register with recess of a pawl of the driving unit, not shown. When the bracket 21 engages the mounting pad of the driving unit the assembler turns the unit until the holes 21 register with tapped holes in the mounting pad, causing the wings 23a of the pawl rod to lock with the pawl.

While the embodiments of the present invention constitute a preferred form, it is to be understood that other forms might be adopted, all coming within the scope of the claims which follow.

What is claimed is as follows:

1. In combination with a solenoid unit, of an axially movable tubular armature; a nut threadedly engaging one end of the armature and having a reduced portion to provide a shoulder; interengaging means on said reduced portion and the armature to secure the nut in position of screw threaded adjustment; a removable plate slidably mounted on the reduced portion; interengaging means on said plate and reduced portion of the nut to prevent turning of plate relative the nut; interengaging means on the plate and a stationary part of the unit to prevent turning of the armature relative to the unit; and biasing means supported by the unit for urging the plate against the shoulder and thereby prevent axial displacement of the plate from the nut.

2. The combination in a solenoid unit of an axially movable tubular armature having external threads at one end and having a longitudinal notch intermediate the ends of the threads, a nut having internal threads engaging the threads of the armature, said nut including an annular flange and having a depending sleeve projecting from the underside of the flange, said sleeve having a plurality of spaced longitudinal external grooves extending from the flange to the end of the sleeve portion and having spaced lugs capable of being bent extending below the end of the sleeve, one of said lugs being bent into the notch to secure the nut in position of screw-threaded adjustment; a removable plate slidably mounted on the sleeve, said washer having means received by one of the grooves to prevent the plate from turning relative to the nut and said plate also having means cooperating with a stationary part of the unit to prevent the armature from turning relative to the unit; and means for biasing the plate against the flange so as to prevent axial displacement of the plate from the nut.

3. The combination in a solenoid unit, of a movable tubular armature having external threads at one end and having a longitudinal recess formed in the threads, a nut threadedly engaging the armature, said nut having a reduced sleeve portion on one side to provide a shoulder, said sleeve portion having a plurality of spaced longitudinal extending grooves in the outer periphery and lugs on the end of the sleeve directly below the grooves, one of said lugs adapted to be deformed into the recess for locking the nut in adjusted position on the armature, a removable washer slidably mounted on the sleeve portion and having a tang adapted to extend into the notch above the bent in lug to prevent the washer from turning relative to the nut, said washer having an extending portion having a longitudinal sliding engagement with a stationary part of the unit whereby said armature and nut are held against rotation in either direction; and yieldable means for holding the washer against the shoulder.

EDWARD M. CLAYTOR.

REFERENCES CITED

The following references are of record in the file of this patent:

UNITED STATES PATENTS

| Number | Name | Date |
|---|---|---|
| 1,942,259 | Schiemer | Jan. 2, 1934 |
| 2,288,938 | Claytor | July 7, 1942 |
| 2,308,660 | Kouyoumjian | Jan. 19, 1943 |

FOREIGN PATENTS

| Number | Country | Date |
|---|---|---|
| 179,065 | Germany | Nov. 30, 1905 |